United States Patent [19]

Grögler et al.

[11] Patent Number: 5,077,339

[45] Date of Patent: Dec. 31, 1991

[54] HEAT-CURING REACTIVE POWDERS BASED ON POLYURETHANES

[75] Inventors: Gerhard Grögler, Leverkusen; Heinrich Hess, Cologne; Richard Kopp, Cologne; Werner Rasshofer, Cologne, all of Fed. Rep. of Germany

[73] Assignee: Bayer Aktiengesellschaft, Leverkusen, Fed. Rep. of Germany

[21] Appl. No.: 621,200

[22] Filed: Nov. 30, 1990

[30] Foreign Application Priority Data

Dec. 6, 1989 [DE] Fed. Rep. of Germany ....... 3940271

[51] Int. Cl.$^5$ .............................................. C08L 75/08
[52] U.S. Cl. .................... 525/185; 252/182.2; 523/201; 523/205; 523/207; 525/902; 525/936; 528/45; 528/76; 528/83
[58] Field of Search ............. 525/185, 902, 936; 523/201, 205, 207; 528/45, 76, 83; 252/182.2

[56] References Cited

U.S. PATENT DOCUMENTS

| | | | |
|---|---|---|---|
| 3,917,741 | 11/1975 | McGarr | 260/859 R |
| 3,933,759 | 1/1976 | Hoeschele | 260/77.5 TB |
| 4,483,974 | 11/1984 | Grögler | 528/68 |

FOREIGN PATENT DOCUMENTS 1260012 9/1989 Canada .

OTHER PUBLICATIONS

Becker "Emulsions, Theory and Practice" 2nd Ed. Pg. 233, 1977.
J. H. Schulmann, J. Leja Transactions of the Fraday Society, vol. 50 pg. 598, 1954.

*Primary Examiner*—Maurice J. Welsh
*Attorney, Agent, or Firm*—Joseph C. Gil; Richard E. L. Henderson

[57] ABSTRACT

The present invention relates to the preparation of powdered heat-curable reaction mixtures in which melt suspension of (a) solid polyisocyanates having melting points above about 60° C., (b) molten high molecular weight isocyanate-reactive compounds having molecular weights of from 400 to 10,000 that have melting or softening points of 50° C. to 150° C., and (c) optionally, solid or liquid low molecular weight chain-extending or crosslinking compounds having molecular weights of from 62 to 399, are added to an inert solvent containing an emulsifier, thereby forming powdered heat-curable reaction mixtures in which components (a), (b), and (c) remain in uncrossedlinked form. The invention further relates to the use of the heat-curing reaction mixtures for the preparation of high-quality polyurethane polyurea plastics.

10 Claims, No Drawings

HEAT-CURING REACTIVE POWDERS BASED ON POLYURETHANES

BACKGROUND OF THE INVENTION

The present invention relates to a process for the preparation of powder-form, heat-curing reaction mixtures by which solid polyisocyanate and high molecular weight isocyanate-reactive compounds that are solid at room temperature are added as melt suspensions to an inert solvent containing an emulsifier. The resultant powdered reaction mixture contains the starting components in uncrosslinked form.

German Offenlegungsschrift 2,330,601 (believed to correspond to U.S. Pat. No. 3,917,741) describes a process for the direct preparation of polyurethanes in finely divided form in which the polyol and polyisocyanate starting components are reacted in an inert solvent in the presence of a polymeric surface-active agent (emulsifier). The characteristic feature of this process is that the polyol compound, which is insoluble in the solvent, is finely emulsified by the emulsifier. A polyisocyanate, which is soluble in the particular solvent, is then added in liquid form to the resulting emulsion. A polyaddition reaction takes place at the phase boundary of the polyol droplet and the resultant polyurethane, which is also insoluble in the solvent, precipitates as a finely divided powder. The polyurethane is completely crosslinked and, when processed in molten form, shows good mechanical properties. The powders are used, for example, as paints or coatings and as adhesives for sheet-form textiles. Industrial articles are produced by press-molding.

Unfortunately, these powders are attended by the serious disadvantage of having their processing temperature very close to the temperature at which polyurethane recleavage reactions begin. Since these thermoplastic polyurethanes already have their final molecular weight, which must be relatively high if they are to show good mechanical properties, they have high melt viscosities at the maximum temperature at which they can be processed. Often, therefore, the flow behavior of the melt is also adversely affected to a considerable extent.

German Offenlegungsschrift 2,330,601 also indicates that both starting components (i.e., the NCO-reactive compound and polyisocyanate) may be insoluble in the inert solvent and that one of the starting components may even be present as a solid. In this case, it is also possible to add a suspension of the solid in the NCO-reactive compound to the inert solvent containing an emulsifier. No corresponding Examples are given in German Offenlegungsschrift 2,330,601.

An interfacial polyaddition reaction always takes place and fully reacted polyurethanes are obtained in finely divided form.

A continuous process involving interfacial polyaddition reactions is also disclosed in U.S. Pat. No. 4,940,750.

German Offenlegungsschrift 2,556,945 claims a process for the direct preparation of polyurethane powders in which the processing disadvantages mentioned in German Offenlegungsschrift 2,330,601 do not arise and the end products retain their favorable mechanical properties. In the disclosed process, low molecular weight and high molecular weight starting polyols are emulsified with an additional monofunctional isocyanate blocking agent (for example, caprolactam) in an inert solvent in the presence of a surface-active compound. After the addition of an aliphatic or aromatic polyisocyanate, a polyurethane powder that still contains free OH and NCO groups is formed. These powders show distinctly lower melt viscosity, coupled with a lower processing temperature, but this temperature (150° C. to 190° C.) is still sufficient to split the thermally unstable NCO adduct. The fully reacted polyurethane is finally obtained after reaction with the free OH groups of the NCO-reactive compound.

A disadvantage of this process is that the blocking agent is regenerated during the final curing phase and, in the case of caprolactam, for example, can sublime out or at least can accumulate at the surface of the molding ("exudation"). The latter behavior applies to many known NCO blocking agents.

The already distinctly reduced processing temperature of the resultant powder is in the range used in the processing of thermoplastics by standard methods and is accepted for such use. However, by comparison with the crosslinking reactions typical of polyurethane chemistry, this processing temperature is high and involves considerable energy consumption.

Accordingly, the problem addressed by the present invention was to provide a simple process for the preparation of storable polyurethane powders that can be cured at a temperature of only 100° C. to 150° C. and which, after heat curing, no longer contain any free NCO groups.

The present invention was also based on the concept of preparing polyurethane powders using solid polyisocyanates with an anti-diffusion layer at the particle surface, of the type obtained by the action of a small amount of aliphatic diamine on a solid diisocyanate, rather than using solid polyisocyanates in which the NCO groups are not blocked by thermally unstable adducts. Solid diisocyanates modified in this way are "deactivated" with respect to attack by NCO-reactive compounds. The anti-diffusion layer is destroyed or made permeable only by the action of heat or organic solvents or by the action of shear forces, thereby allowing the polyaddition reaction to take place. The process for "retarding solid polyisocyanates" is described in German Offenlegungsschrift 3,230,757 (European Patent Application 103,323 and believed to correspond to U.S. Pat. No. 4,483,974).

German Offenlegungsschrift 2,330,601 teaches that crosslinked polyurethane powders are also formed when one of the starting components is present as a solid. This solid may optionally be dispersed in the other, liquid component. If this heterogeneous mixture is added to the inert solvent in the presence of an emulsifier, fully reacted polyurethane powders are obtained after a certain reaction time.

Accordingly, several tests were carried out using methods known in the art using starting compounds not yet cited in the patent literature. An amine-terminated liquid polyether that is highly reactive to isocyanate groups (prepared in accordance with European Patent Application 219,035 by hydrolysis of an NCO preadduct of one mole of polypropylene glycol ether (molecular weight 2,000, OH value 56) and two moles of toluene diisocyanate ("TDI")) was used as the high molecular weight component. A solid diisocyanate (dimeric TDI, or "TT") provided with an anti-diffusion layer (see European Patent Application 103,323) was used as the polyisocyanate component. The following procedure was used according to the invention. The dimeric TDI ("TT") was added in an equivalent quantity to a solution containing a small quantity of an aliphatic diamine (i.e., isophoronediamine) in the $NH_2$-terminated polyether based on polypropylene glycol ether (molecular weight 2,000). The quantity of aliphatic diamine was selected to be just sufficient to form an anti-diffusion layer, as could be readily determined by one skilled in the art, within the range of 0.01–20 equivalent % of aliphatic amine based on solid isocyanate, preferably 0.1–3 equivalent %. A thin polyurea shell acting as an anti-diffusion layer formed on the surface of the solid TT particles after a short time, thereby forming a dispersion that was stable at room temperature. The deactivated material could be cured only by heating (100° C. to 120° C.), resulting in the formation of a solid highly elastic molding of high thermal stability. The described dispersion was then added to an inert solvent (i.e., hexane) in the presence of a surface-active compound (ANTARON V, a product of GAF-Europa), the mixture being effectively emulsified in hexane by means of a high-speed stirrer. An emulsion of finely divided droplets in the inert solvent was obtained at room temperature. After stirring, the two phases separated and the droplets changed into relatively coarse particles after standing for a prolonged period. After separation of the hexane, the reaction product used was recovered in unchanged form. No polyaddition had taken place.

This result is surprising in two respects and could not have been expected from the patent literature.

According to German Offenlegungsschrift 2,330,601, fully reacted polyurethanes are obtained when using an inert solvent containing emulsifiers, even when neither the polyol component nor the polyisocyanate component dissolves in the inert solvent and one of the starting components is present as a solid. This teaching, however, does not apply in the test described above, which is all the more surprising because the components used in the test are highly reactive components containing $NH_2$ groups.

German Offenlegungsschrift 3,230,757, states that, although combinations of "retarded solid polyisocyanates" (those having an anti-diffusion layer formed by a polyurea shell) and a low molecular weight or high molecular weight NCO-reactive compound are stable in storage at room temperature, a spontaneous polyaddition reaction does take place under the effect of solvents (partial dissolving or swelling of the anti-diffusion layer) or under the effect of shear forces (high-speed stirrer). This teaching also does not apply in the test described above. Crosslinked polyurethane ureas are not obtained in either case and the starting components are recovered in unchanged form.

In further tests, the $NH_2$-containing polyether that is liquid at room temperature was replaced by an $NH_2$-containing polyester that is solid at room temperature (i.e., a polyadipate). Accordingly, mixing with the "stabilizing diamine" isophoronediamine ("IPDA") and the dimeric TDI ("TT") was carried out at a temperature above the melting temperature of the $NH_2$ polyester (50° C. to 60° C.). Even at this temperature, no reaction between the components occurred because of the anti-diffusion layer produced by IPDA on the surface of the TT particles. The resultant melt was added dropwise with stirring to an inert solvent (i.e., hexane) that also contained a surface-active compound. A solid powder consisting of unchanged $NH_2$ polyester and TT was obtained after a short time at room temperature. The powder, which accumulated as spherical particles, was free-flowing (particle size 5 to 200 μm) and could be processed by standard "powder technology".

In contrast to the polyurethane powders described in German Offenlegungsschriften 2,330,601 and 2,556,945, the powders produced by the process according to the invention are uncrosslinked. These powders afford the crucial processing advantages of a relatively low starting viscosity of the melt and rapid setting to high-quality products at low curing temperatures.

SUMMARY OF THE INVENTION

The present invention relates to a process for the preparation of powdered heat-curable reaction mixtures comprising adding melt suspensions of
  (a) solid polyisocyanates (optionally deactivated) having melting points above about 60° C.,
  (b) molten high molecular weight isocyanate-reactive compounds having molecular weights of from about 400 to about 10,000 that are solid at room temperature and have melting or softening points of about 50° C. to about 150° C., and
  (c) optionally, solid or liquid low molecular weight chain-extending or crosslinking compounds having molecular weights of from about 62 to about 399,
to an inert solvent containing an emulsifier, thereby forming powdered heat-curable reaction mixtures in which components (a), (b), and (c) remain in uncrosslinked form.

The present invention also relates to powder-form, uncrosslinked reaction mixtures which are stable in storage at room temperature and which can be cured under the effect of heat.

The present invention further relates to the use of the heat-curing reaction mixtures for the preparation of high-quality polyurethane urea plastics.

DETAILED DESCRIPTION OF THE INVENTION

Solid polyisocyanates reduced by grinding in a suitable mill to a particle size of about 1 to about 200 μm (preferably 1 to 50 μm) are used as isocyanate components for the reactive powders of the invention. The melting point of the polyisocyanates should be above about 60° C., preferably above 80° C. Suitable polyisocyanates are any of those described in European Patent Application 103,323 (believed to correspond to U.S. Pat. No. 4,483,974, which is incorporated by reference).

Preferred polyisocyanates according to the invention include dimeric 2,4-diisocyanatotoluene ("TT"), dimeric 4,4'-diisocyanatodiphenylmethane, 3,3'-diisocyanato-4,4'-dimethyl-N,N'-diphenylurea, N,N'-bis(4-(4-isocyanatophenylmethyl)phenyl)urea, and 1,5-diisocyanatonaphthalene.

Suitable polyesters used according to the invention include OH- and/or $NH_2$-terminated components that are solid at room temperature and have a molecular weight in the range from about 400 to about 10,000 (preferably in the range from 1,000 to 5,000). The melting point or solidification point is in the range from about 50° C. to about 150° C. (preferably in the range from 50° C. to 100° C.).

Suitable polyesters containing hydroxyl groups for use according to the invention include reaction products of polyhydric alcohols (preferably dihydric, and optionally trihydric and higher alcohols) with polybasic (preferably dibasic) polycarboxylic acids or anhydrides thereof or corresponding polycarboxylic acid esters of lower alcohols.

The polycarboxylic acids may be aliphatic, cycloaliphatic, aromatic, araliphatic, and/or heterocyclic and may optionally be substituted (for example, by halogen atoms), although they may also be unsaturated. Examples of such carboxylic acids and derivatives thereof are adipic acid, sebacic acid, azelaic acid, dodecanedioic acid, phthalic acid, isophthalic acid, tetrahydrophthalic anhydride, tetrachlorophthalic anhydride, endomethylene tetrahydrophthalic anhydride, glutaric anhydride, maleic anhydride, fumaric acid, dimerized and trimerized unsaturated fatty acids, terephthalic acid dimethyl ester, and terephthalic acid bis-glycol ester.

Suitable polyhydric alcohols include ethylene glycol, 1,2- and 1,3-propanediol, 1,4- and 2,3-butanediol, 1,6-hexanediol, 1,10-decanediol, neopentyl glycol, 1,4-bis(-hydroxymethyl)cyclohexane, 2-methyl-1,3-propanediol, glycerol, trimethylolpropane, 1,2,6-hexanetriol, pentaerythritol, quinitol, mannitol and sorbitol, formitol or formose, methyl glycoside, and di-, tri- and tetraethylene glycols, -propylene glycols, and -butylene glycols.

Polyesters of lactones (such as ε-caprolactone) or hydroxycarboxylic acids (such as ω-hydroxycaproic acid), may also be used.

Suitable polyacetals include compounds obtainable from glycols and formaldehyde.

Suitable polycarbonates containing hydroxyl groups include known compounds that may be prepared by the reaction of 1,3-propanediol, 1,4-butanediol, and/or 1,6-hexanediol, di-, tri-, or tetraethylene glycol, and thiodiglycol with diaryl carbonates (such as diphenyl carbonate) or phosgene.

Other representatives of the compounds mentioned are described in detail, for example, in *High Polymers*, Vol. XVI, "Polyurethanes: Chemistry and Technology", edited by Saunders and Frisch, Interscience Publishers (New York, London), Vol. I (1962), pages 32 to 42 and pages 44 to 54, and Vol. II (1964), pages 5 to 6 and 198 to 199; *Kunststoff-Handbuch*, Vol. VII, Vieweg-Höchtlen, Carl-Hanser-Verlag, Munich (1966), for example on pages 45 to 71; and in German Offenlegungsschrift 2,854,384.

Mixtures of the polyhydroxyl compounds mentioned above may of course be used.

Suitable relatively high molecular weight polyamino compounds containing aromatic amino groups and having a molecular weight in the range described above for relatively high molecular weight polyester compounds include, preferably, the polyamino compounds that may be obtained by hydrolysis (preferably basic hydrolysis) of corresponding NCO prepolymers based on the relatively high molecular weight polyhydroxyl compounds described above and excess aromatic diisocyanates. Examples of this process can be found in German Offenlegungsschrift 2,948,419, which also mentions other state-of-the-art processes for the preparation of aromatic amino compounds of relatively high molecular weight. Other examples are the aminopolyethers obtainable in accordance with U.S. Pat. No. 2,888,439. These compounds are preferred.

Also suitable for the preparation of the reactive powders of the invention are relatively high molecular weight compounds (molecular weight in the range from 400 to 10,000 and preferably in the range from 1,000 to 5,000) that are solid at room temperature of the type typically used for the synthesis of polyurethanes. See, for example, German Offenlegungsschrift 2,920,501. Examples of such compounds include polyethers, polyacetals, and polythioethers.

The reactive powders of long storage life according to the invention can also be prepared using low molecular weight chain-extending or crosslinking agents that are solid or liquid at room temperature. Suitable compounds include compounds having a functionality of two or more which contain hydroxyl groups attached to aliphatic and/or cycloaliphatic groups and/or $NH_2$ groups attached to aromatic rings (including heterocyclic rings of aromatic character) and which have molecular weights in the range from 62 to 399. Low molecular weight diols containing hydroxyl groups attached to aliphatic or cycloaliphatic groups and aromatic diamines having molecular weights in the range mentioned are preferred. Suitable such compounds generally contain 2 to 8 (preferably 2 to 4 and, more preferably, 2) isocyanate-reactive hydrogen atoms, such as hydroxyl and/or amino groups. Mixtures of different chain-extending agents or crosslinking agents may, of course, also be used. Examples of such compounds include ethylene glycol, trimethylene glycol, 2,3- and/or 1,4-butanediol, 1,6-hexane-diol, neopentyl glycol, 1,4-bis(hydroxyethyl)cyclohexane, 1,4-dihydroxycyclohexane, terephthalic acid bis(β-hydroxyethyl) ester and, less preferably, diols containing secondary hydroxyl groups, such as propylene glycol, 2,3-butanediol, or 2,5-pentanediol. Suitable polyfunctional compounds include trimethylolpropane, trimethylolethane, 1,2,6-hexanetriol, glycerol, pentaerythritol, quinitol, mannitol, sorbitol, castor oil, and also di-, tri- and tetraethylene, propylene and butylene glycols, bis(2-hydroxyethyl)hydroquinone, bis(2-hydroxyethyl)resorcinol, formose, or formitol. Diols or polyols containing tertiary amines are also suitable and include, for example, N-methyldiethanolamine, triethanolamine, or N,N'-bis(hydroxyethyl)piperazine.

Low molecular weight aromatic diamines, however, are preferably used instead of low molecular weight polyols. Aromatic polyamines are also understood to include amines in which the amino group is attached to heterocyclic radicals of aromatic character. Suitable aromatic polyamines include p-phenylenediamine, 2,4- and/or 2,6-toluenediamines, diphenylmethane-4,4'- and/or -2,4'- and/or -2,2'-diamines, 3,3'-dichloro-4,4'-diaminodiphenylmethane, 3-($C_{1-8}$ alkyl)-4,4'-diaminodiphenylmethanes, 3,3'-di(C alkyl)-4,4'-diaminodiphenylmethanes, and 3,3',5,5'-tetra($C_{1-4}$ alkyl)-4,4'-diphenylmethanes, 4,4'-diaminodiphenyl sulfides, sulfoxides, or sulfones, diamines containing ether groups according to German Offenlegungsschriften 1,770,525 and 1,809,172 (U.S. Pat. Nos. 3,654,364 and 3,736,295), 2-halo-1,3-phenylenediamines optionally substituted in the 5-position (German Offenlegungsschriften 2,001,772, 2,025,896, and 2,065,869), bis-anthranilic acid esters (German Offenlegungsschriften 2,040,644 and 2,160,590), 2,4-diaminobenzic acid esters according to German Offenlegungsschrift 2,025,900, and tolylenediamines substituted by one or two ($C_{1-4}$ alkyl) groups. Particularly preferred aromatic polyamines are 3,5-diethyl-2,4- and/or -2,6-diaminotoluene (particularly technical (80/20) or (65/35) isomer mixtures thereof), asymmetrically tetraalkyl-substituted diaminodiphenylmethanes such as 3,5-diethyl-3',5'-diisopropyl-4,4'-diaminodiphenylmethane, 4,4'-diaminobenzanilide, 3,5-diaminobenzoic acid ($C_{1-4}$ alkyl) esters, 4,4'- and/or 2,4'-diaminodiphenylmethane, and naphthylene-1,5-diamine.

The aromatic diamines are preferred to the glycols. However, it is also possible to use diols or diamines containing additional groups, for example, adipic acid bis(2-hydroxyethyl) ester, terephthalic acid bis(2-hydroxyethyl) ester, diol urethanes, diol ureas, or polyols containing sulfonate and/or phosphonate groups, such as 1,6-hexamethylene-bis(2-hydroxyethylurethane), 4,4'-diphenylmethane-bis-(2-hydroxyethylurea). Other low molecular weight compounds are described in detail, for example, in German Offenlegungsschrift 2,854,384.

Suitable catalysts for the one-component systems of long storage life according to the invention include any of the typical polyurethane catalysts, among which organolead and/or organotin compounds may be used to particularly good effect, optionally in conjunction with other typical polyurethane catalysts, particularly catalysts containing tertiary amines.

Suitable inert solvents for the preparation of the reactive powders according to the invention are liquids, preferably organic liquids, which do not react with the reactants and in which the reactants are insoluble or substantially insoluble. Suitable solvents include organic solvents having a boiling point of about 60° C. to about 200° C., such as hydrocarbons, halogenated hydrocarbons, and ethers. Liquid hydrocarbons, preferably aliphatic hydrocarbons, such as petroleum fractions, have proved to be particularly suitable because, despite their low cost, they show ideal inert behavior toward the reaction components and can easily be completely removed from the end product.

It is extremely important for the practical application of the process to use an effective surface-active agent that is capable of forming and maintaining an emulsion of finely divided melt droplets until they change into a solid state. Information on the nature and constitution of such emulsifiers for non-aqueous emulsions and on theoretical principles can be found in the existing literature. See, for example, Becker (*Emulsions, Theory and Practise*, 2nd Edition, page 233) or J. H. Schulmann and J. Leja (*Transactions of the Faraday Society*, Vol. 50, page 598). In addition, the effectiveness and chemical constitution of emulsifiers for non-aqueous systems is also reported in detail in the patent literature, for example, in German Offenlegungsschriften 2,330,601 and 2,556,945.

In tests involving various known emulsifiers, emulsifiers prepared by polymerization of N-vinyl-2-pyrrolidone with long-chain α-olefins have proved to be particularly favorable for the preparation of the reactive powders according to the invention. These products are commercially available under the name of ANTARON V (GAF-Europa, Esher, Surrey, England).

The reactive powders according to the invention are easy to prepare on an industrial scale.

The polyester that is solid at room temperature is melted in a suitable reaction vessel. The solid polyisocyanate and the optional low molecular weight chain-extending agents and catalysts are added as powders to the resulting melt, a suitable stirrer being used to provide thorough mixing of the reaction mixture. Under the conditions used in the process of the invention, the melt is a "melt suspension" in which the polyisocyanate remains as a solid suspended within the molten component.

When using isocyanate-reactive starting components such as amine-terminated low molecular weight or high molecular weight compounds, the solid diisocyanate should be additionally "deactivated" with aliphatic polyamines. The anti-diffusion layer formed on the particle surface of the isocyanate prevents a premature reaction from taking place in the reaction vessel where it could lead to a distinct increase in viscosity or even to gelling of the reaction mixture. In general, the small quantities of the aliphatic diamine are added before addition of the solid polyisocyanate (as illustrated in the Examples). The melt is then slowly added with intensive stirring to an inert solvent. It may sometimes be advisable to cool the inert solvent, particularly when the melting point of the polyester falls in a relatively low temperature range (for example, 50° to 70° C.). The quantity of solvent used is not critical. It is generally sufficient to use about one to about five times (preferably one to two times) the quantity based on the reaction mixture.

It is absolutely essential that the inert solvent contain a surface-active compound which rapidly converts the melt flowing in into an emulsion of finely divided droplets. The quantity of surface-active compound used may be from about 0.5 to about 10% by weight, based on the total weight of the reactants. The surface-active compound is generally used in a quantity of 2 to 6% by weight, based on the total weight of the reactants. The liquid droplets formed in finely divided form soon solidify into solid particles in which the starting reactants remain completely or substantially uncrosslinked. Agglomeration to relatively large agglomerates has not been observed. Conversion from the liquid to the solid state does, of course, depend on the melting point of the high molecular weight NCO-reactive compound and takes place more quickly with a higher melting point. After the stirrer has been switched off, the solid rapidly sediments, so that the resultant powder may readily be separated from the inert solvent.

A free-flowing reactive powder is obtained in the form of spherical particles from about 5 to about 200 μm in diameter. Under a microscope, it can be seen that the solid diisocyanate (diameter approx. 5 μm) is enclosed within the individual microspheres and is completely surrounded by the solid polyester. This is an advantage insofar as, after melting, powders of this type are basically more homogeneous and, with prolonged storage, do not separate so rapidly into their individual solid components.

Reactive powders in which the solid principal components are present separately from one another may be produced by simple mixing of the individual components in an inert solvent, an emulsion of the NCO reactive compound being prepared first. After the melt droplets have solidified, the solid diisocyanate is added and the mixture is thoroughly homogenized. For the reasons explained above, however, this process variation is not preferred.

A characteristic feature of the reactive powders is that, in contrast to the powders described in the patent literature, they consist of starting components which have not fully reacted, surprisingly even when highly reactive compounds (such as, for example, low molecular weight and high molecular weight $NH_2$-terminated components) are present.

The powders may be processed by known industrial methods. Above the melting point of the solid NCO-reactive component, a liquid suspension is obtained.

This suspension solidifies rapidly into the end product if the temperature is increased. The transition from powder to melt depends on the melting point of the NCO-active compound. In contrast, the transition from melt to solid end product may be controlled through the anti-diffusion layer on the solid polyisocyanate, through catalysts, and through the temperature. If the starting compounds selected are such that the transition from melt suspension to end product is slow, the powders may also be processed by casting. In this case, the reaction mixtures still have an adequate "pot life". In general, however, the reactive powders are processed by known methods of powder technology.

The good flow behavior of the powders in the molten state is a particular advantage of the invention. Good flow behavior is absolutely essential in the preparation of moldings of complicated geometry. Another advantage lies in the ability of the low-viscosity melts to take up a very much larger quantity of fillers (e.g., minerals, glass powder) than do high-viscosity melts.

The reactive powders according to the invention have an average particle size of from about 200 μm down to about 5 μm. This particle size is largely determined by the type and quantity of surfactant used, by the intensity of stirring, and by the temperature. For a given system and given apparatus, the particle size becomes smaller if the quantity of surfactant is increased and vice versa. Particles in this size range are eminently suitable for a variety of painting and coating processes, for example, for fluidized bed coating, for electrostatic spraying, for powder coating, and for the heat melting process for forming coatings on flexible workpieces. The powders are also suitable as hot-melt adhesives, in which the powder is generally applied to the desired surface in pigmented form and heated to its "activation temperature".

Another application for the reactive powders is in the preparation of two-phase systems. In such systems, the solid powders are used in admixture with typical OH- and/or NH$_2$-terminated polyalkylene oxide ethers, the liquid polyether representing the suspension medium for the powder and being reacted with conventional polyisocyanates (such as TDI and MDI), as well as any optional catalysts and auxiliaries, in the usual way. This type of process can be carried out only when the reactive powder is substantially insoluble in the polyether (for example, polypropylene oxide ether). If the temperature is suitably controlled, the polyaddition reaction may be carried out in two separate steps. In the first step, the polyether reacts with the liquid polyisocyanate, the reaction temperature being kept below the melting point of the reactive powder. The resultant polyurethane (polyether matrix) may then be hardened either immediately or at some later stage by increasing the temperature, as a result of which the reactive powder cures. Highly elastic, homogeneous two-phase systems of polyester and polyether are finally obtained in which the mechanically stronger urethane, the polyester urethane, positively influences the overall properties of the elastomer to a very considerable extent (i.e., strengthening effect).

Two-phase systems of this type cannot be produced by conventional polyaddition with isocyanates because the liquid phases, mainly the polyether and polyester melts, immediately separate because of their incompatibility (i.e., insolubility). Inhomogeneous end products, often with tacky surfaces, are obtained after the polyaddition.

Fillers of any kind (for example, silica, chalk, glass fibers, and glass powder) may, of course, be added to the powders or even to the powder melts. The addition of fillers can be of advantage during further processing with respect to flow behavior, curing pattern, curing rate, or price.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius.

EXAMPLES

Example 1

A polyester (molecular weight 2,000, OH value 56) (200 g) of adipic acid and a mixture of ethylene glycol and 1,4-butanediol was melted with stirring and degassing under an aspirator vacuum. A tin catalyst UL 29 (dioctyl tin bis-mercaptoacetic acid ester, a product of Witco) (0.1 g) was added to the resulting melt at approximately 60° C., and dimeric TDI ("TT", m.p. 154° C.) (36 g) was then added. The reaction mixture was homogeneously mixed and subsequently added dropwise to a solution of 4 g of ANTARON V 216 (emulsifier manufactured by GAF-Europa) in 400 g of white spirit at 5° to 10° C., the melt being effectively emulsified in the inert white spirit solvent by vigorous stirring. After a short time, the finely divided melt droplets solidified and a free-flowing, spherical powder (particle diameter of 5 to 100 μm) was obtained after separation by filtration. The powder had a storage life of several weeks at room temperature.

This reactive powder could be poured at any time into a mold coated with release agent and then brought into a state of complete coalescence at a temperature of 50° to 60° C. Further curing then took place at approximately 120° to 130° C. After about 2 hours, the test specimen could be removed from the mold. After storage for about 7 days at room temperature, the following mechanical properties were measured:

| | |
|---|---|
| modulus (100%) (MPa) | 8.9 |
| tensile strength (MPa) | 42 |
| elongation at break (%) | 650 |
| tear propagation resistance (KN/m) | 45 |
| elasticity (%) | 57 |
| Shore A hardness | 84 |

Example 2

After being melted at 50° to 60° C., 0.4 g of LAROMIN C (bis(3-methyl-4-aminocyclohexyl)methane, a product of BASF) was added to 200 g of an NH$_2$-terminated linear polyester (NH value 43.1) prepared by alkaline hydrolysis of an NCO preadduct of 1 mole of polyester (based on adipic acid and ethylene glycol, molecular weight 2,000, OH value 56) and 2 moles of 2,4-diisocyanatotoluene ("TDI"). Dimeric TDI (24.2 g) was then added. After thorough mixing, the melt suspension was added dropwise with vigorous stirring to 400 g of hexane containing 4 g of ANTARON V 226 at a temperature of approximately 10° to 15° C. After about 1 hour, the now solid reactive powder could be separated off. The powder had a storage life of several months at room temperature.

A high-quality polyurethane urea material was obtained as in Example 1 by heat curing at 120° to 130° C. The elastomer was then conditioned for 2 to 3 hours at 120° C.

The elastomer prepared by casting had the following properties:

| modulus (100%) (MPa) | 10.5 |
| --- | --- |
| tensile strength (MPa) | 38.6 |
| elongation at break (%) | 620 |
| tear propagation resistance (KN/m) | 76.5 |
| elasticity (%) | 45 |
| Shore A hardness | 94 |

Example 3

A linear, solid polyester (200 g) of adipic acid and ethylene glycol (molecular weight 2,000, OH value 56) was heated to 60° C. 1,4-Butanediol (chain extender) (6 g), UL 29 (catalyst) (0.4 g), and ethylenediamine ("coating diamine" for the anti-diffusion layer) (3 g) were added with stirring to the resulting melt. Finally, 1,5-diisocyanatonaphthalene ("NDI") (56.4 g) ground to a particle size of 5 to 50 μm in an air jet mill was added. The melt suspension was degassed under an aspirator vacuum and then added dropwise with vigorous stirring to a solution of 4 g of ANTARON V 216 (emulsifier) in 500 g of hexane at a temperature of 10° to 15° C. After about 1 to 2 hours, the resultant NDI-based reactive powder could be separated off. A free-flowing powder with a storage life of several months at room temperature was again obtained. To obtain an insight into the mechanical properties of the cured end products, the reactive powder was processed by casting to an elastomer having the following properties:

| modulus (100%) (MPa) | 7.5 |
| --- | --- |
| tensile strength (MPa) | 52.8 |
| elongation at break (%) | 621 |
| tear propagation resistance (KN/m) | 64.2 |
| elasticity (%) | 55 |
| Shore A hardness | 87 |

This elastomer exhibited a very high level of mechanical properties.

Example 4

An NH$_2$-terminated polyester (NH value 33.4) (400 g) based on a polyester of adipic acid and a mixture of ethylene glycol and 1,4-butanediol (molecular weight 2,000, OH value 56) was mixed in molten form at 60° to 70° C. with 1 g of LAROMIN C (for the anti-diffusion layer) and then with 43.8 g of 3,3'-diisocyanato-4,4'-dimethyl-N,N'-diphenylurea (prepared from 2 moles of 2,4-diisocyanatotoluene and 1 mole of water; m.p. >230° C. with decomposition). After degassing, the melt suspension was introduced into a solution of 7 g of ANTARON V 226 in 800 g of white spirit at a temperature of 5° to 10° C., giving 395 g of a reactive powder as spherical particles as described above. The powder was cured at about 130° C., forming a high-quality elastomer which was distinguished in particular by high thermal stability.

The following mechanical properties were measured:

| modulus (100%) (MPa) | 10.8 |
| --- | --- |
| tensile strength (MPa) | 40.5 |
| elongation at break (%) | 650 |
| tear propagation resistance (KN/m) | 87.8 |
| elasticity (%) | 55 |
| Shore A hardness | 95 |

Example 5

The reactive powder described in Example 4 was then modified with a low molecular weight, liquid chain extender containing NH$_2$ groups (i.e., 2,4-diamino-3,5-diethyltoluene). A melt suspension of the following components was then prepared as described in the preceding Examples and subsequently converted into the reactive powder in a solution of hexane and ANTARON V:

| 200 g | an NH$_2$ polyester (see Example 4) |
| --- | --- |
| 0.5 g | LAROMIN C ("coating amine" for the solid diisocyanate) |
| 10 g | 2,4-diamino-3,5-diethyltoluene (chain extender) |
| 48 g | 3,3'-diisocyanato-4,4'-dimethyldiphenylurea |

The elastomer obtained as described above from the reactive powder was distinguished by high rigidity (Shore D hardness 58) and in particular by very high thermal stability.

Example 6

The liquid, low molecular weight chain extender containing NH$_2$ groups described in Example 5 was replaced by a solid, high-melting chain extender containing NH$_2$ groups, namely, 3,3'-diamino-4,4'-dimethyldiphenylurea (m.p. 235° C. with decomposition) obtainable from 2,4-toluenediamine and urea. The melt suspension consisted of the following components:

| 200 g | an NH$_2$ polyester (see Examples 4 and 5) |
| --- | --- |
| 0.9 g | LAROMIN C |
| 17.3 g | 3,3'-diamino-4,4'-dimethyldiphenylurea |
| 42.6 g | 3,3'-diisocyanato-4,4'-dimethyldiphenylurea |

A reactive powder (225 g) was obtained as described above in a solution of white spirit and ANTARON V 216.

By applying this powder to a metal plate (galvanized iron) and then exposing it to a temperature of 120° to 130° C., a hard but elastic coating of the polyurethane urea that adhered firmly to the metal was obtained after only a short time.

Example 7

The reactive powders may also be advantageously used in admixture with OH- or NH$_2$-terminated polyethers in which the powder components are substantially insoluble and the suspension formed has a relatively long storage life at room temperature. The liquid polyol (suspension medium) may then be crosslinked with a conventional liquid or solid polyisocyanate (e.g., TDI, MDI, or TT). If the polyaddition reaction takes place in a temperature range in which the reactive powder does not react, the resultant polyurethane or polyurea system forms the embedding medium (matrix) for the unchanged powder or the melt droplets which have not yet solidified (at temperatures above the melting point of the polyester). The final curing of these two-phase systems may then take place in one step or at a later stage at elevated temperature (120° to 130° C.), after which a fully crosslinked and homogeneous-looking two-phase system (for example, of polyether urethane and polyester urethane) is formed. Whether the polyether urethane or the polyester urethane forms the embedding medium (matrix) in the two-phase system is determined by the quantitative ratio in which the two substances are present in the reaction mixture.

In this Example, a storable heat-curing obtained by mixing of the following components (mixture A) was used as the suspension medium for the reactive powder:

| | |
|---|---|
| 200 g | a polypropylene glycol ether containing NH$_2$ groups (NH$_2$ value 47) prepared by alkaline hydrolysis of an NCO preadduct of 1 mole of polypropylene glycol ether (molecular weight 2,000, OH value 56) and 2 moles of TDI |
| 0.3 g | Laromin C |
| 14.6 g | dimeric TDI ("TT") |

The polyester-based reactive powder described in Example 6 (70 g) was added to and homogeneously stirred with 100 g of the polyether-based liquid mixture A. After degassing, the reaction mixture was poured into a mold and gradually heated to 120°–130° C. A homogeneous elastomer (B) having the mechanical properties shown in the following table was obtained after a short time.

An elastomer having the properties shown below (A') was similarly prepared from the suspension medium by heating to 120°–130° C.:

| | A' | B |
|---|---|---|
| modulus (100%) (MPa) | 8.2 | 11.9 |
| tensile strength (MPa) | 13.5 | 20.5 |
| elongation at break (%) | 600 | 550 |
| tear propagation resistance (KN/m) | 26.9 | 47.5 |
| elasticity (%) | 68 | 66 |
| Shore A hardness | 94 | 95 |

Comparison of the properties of A' and B clearly shows the strengthening effect of the polyester urethane urea in the two-phase system, the tear propagation resistance and tensile strength values being considerably improved.

Example 8

UL 29 (catalyst manufactured by Witco) (0.1 g) and then the reactive powder described in Example 4 (40 g) were added to a trifunctional polypropylene glycol ether (molecular weight 3,000, OH value 56) (100 g), followed by thorough mixing and degassing. Although addition of the reactive powder produced an increase in viscosity, the mixture was still readily processable. A liquid 4,4'-diisocyanatodiphenylmethane ("MDI") modified with tripropylene glycol (18.3 g) was then added with stirring. After about 3 hours at room temperature, a soft elastic material, in which the reactive powder was present in unchanged form, was obtained.

By heating this intermediate product for 2 to 3 hours at 120° C., a highly elastic homogeneous-looking molding having a dry surface was obtained. In this two-phase system, the matrix was formed by the polyester urethane in which the highly elastic polyester particles were present in crosslinked form and hence had a strengthening effect on the end product.

Example 9 (Slush Molding)

The reactive powders may also be used with advantage for slush molding. In this Example, this processing technique was illustrated using a special test apparatus.

The apparatus consisted of a shaped upper shell measuring approximately 300×300×100 mm and of a trough-like lower part. Both parts of the mold were held together by suitable clamps and were sealed using a flat seal between the two shells. The mold was mounted in a fixable rotation unit. The lower shell was designed to be heated up to its upper edge.

A standard heating cabinet was also used, its function being to heat the contouring upper shell to the working temperature and thereafter to heat the outer skin moldings formed.

Test Procedure

The powder-form one-component system (heated to 25° C.) was introduced into the trough-like lower part in such a quantity that the upper shell was at least completely filled.

After the flat seal had been applied, the upper shell (heated to 130° C.) was clamped onto the lower part of the mold and the mold as a whole was turned through 180° about its horizontal axis. The one-component system from the lower part of the mold thus filled the upper shell (which cooled in the meantime to 110° to 120° C.) and began to react on the wall of the upper shell, a compact skin being formed via a high-viscosity liquid phase and recuring. The wall thickness of the elastomer could be controlled through the temperature of the upper shell and the contact time of the one-component system with the heated outer shell.

After a predetermined time (for example, 30 seconds) the two-part mold was turned back into its starting position. The dropping of the powder from the upper shell into the lower trough could be assisted by knocking the wall of the upper shell. The one-component system which had solidified on the mold wall of the upper shell was separated with the upper shell from the lower part of the mold, heated in the upper shell for 10 minutes at 120° C. in the heating cabinet, and then demolded after cooling.

These outer skins had the required high mechanical property level. Their tear propagation resistance in particular was of considerable interest, amounting in the present Example to 56.4 KN/m. The outer skins also passed the rigorous heat aging test (500 hours at 130° C.). The outer skins retain their elastomeric properties.

The outer skin molding can then be placed in a standard foaming mold having the same contour as the upper shell and back-foamed with any polyurethane foam system (applications, for example, including arm rests for the automotive field).

What is claimed is:

1. A process for the preparation of a powdered heat-curable reaction mixture comprising adding a melt suspension of
   (a) a solid polyisocyanate having melting points above 60° C.,
   (b) a molten high molecular weight isocyanate-reactive compound having a molecular weight of from 400 to 10,000 that is solid at room temperature and has a melting or softening point of 50° C. to 150° C., and (c) optionally, a solid or liquid low molecular weight chain-extending or crosslinking compound having a molecular weight of from 62 to 399, to an inert solvent containing an emulsifier, thereby forming a powdered heat-curable reaction mixture in which components (a), (b), and (c) remain in uncrosslinked form.

2. A process according to claim 1 additionally comprising separating the powdered heat-curable reaction mixture from the inert solvent.

3. A process according to claim 1 wherein the emulsifier is a compound obtained by polymerization of N-vinyl-2-pyrrolidone with a long-chain α-olefin.

4. A process according to claim 1 wherein the solid polyisocyanate (a) is deactivated by adding to said solid polyisocyanate in the presence of the isocyanate-reactive component (b) an aliphatic diamine in a quantity sufficient to form an anti-diffusion layer.

5. A process according to claim 1 wherein the isocyanate-reactive component (b) is a polyester having a molecular weight of 500 to 10,000 and a melting point or softening point of 50° C. to 150° C.

6. A process according to claim 5 wherein the polyester has a molecular weight of 1000 to 5,000.

7. A process according to claim 5 wherein the polyester has a melting point or softening point of 50° C. to 100° C.

8. A process according to claim 1 wherein the isocyanate-reactive component (b) is a $NH_2$-terminated compound having a molecular weight of 500 to 10,000.

9. A process according to claim 8 wherein the polyester has a molecular weight of 1000 to 5,000.

10. A method for the preparation of a polyurethane polyurea comprising heating a powdered heat-curable reaction mixture prepared according to claim 1 to a temperature above the melting or softening point of the isocyanate-reactive component (b).

* * * * *